R. H. THOMAS.
TRAP VALVE.
APPLICATION FILED APR. 3, 1911.
1,024,163.
Patented Apr. 23, 1912.
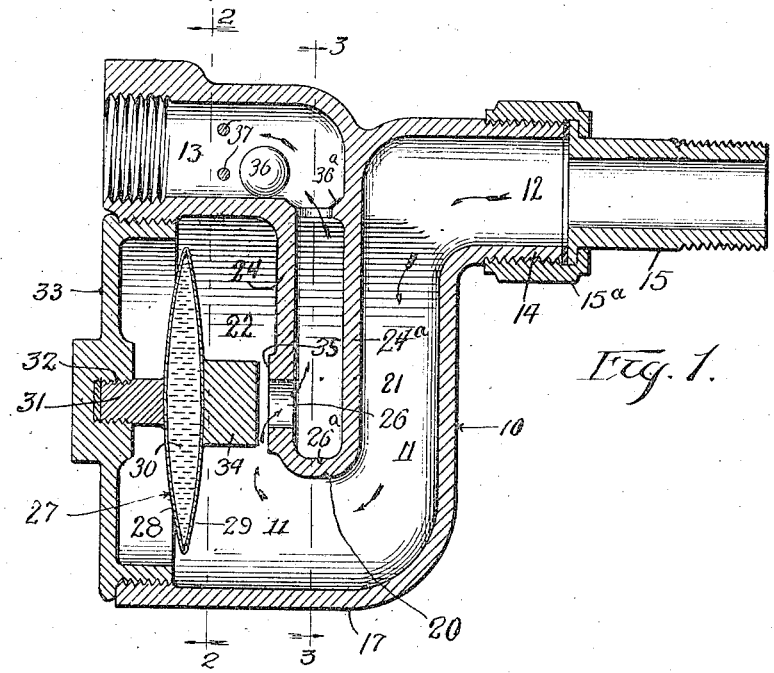
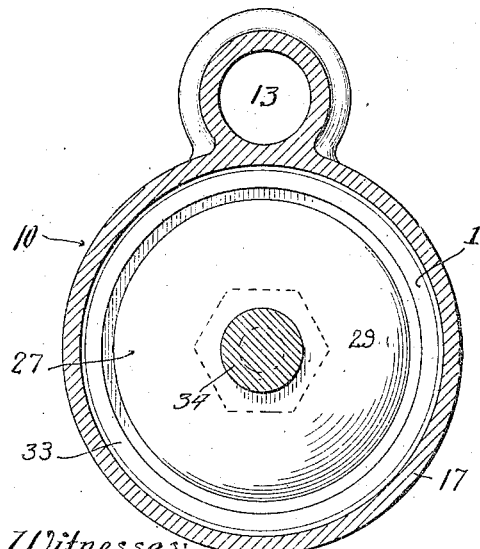
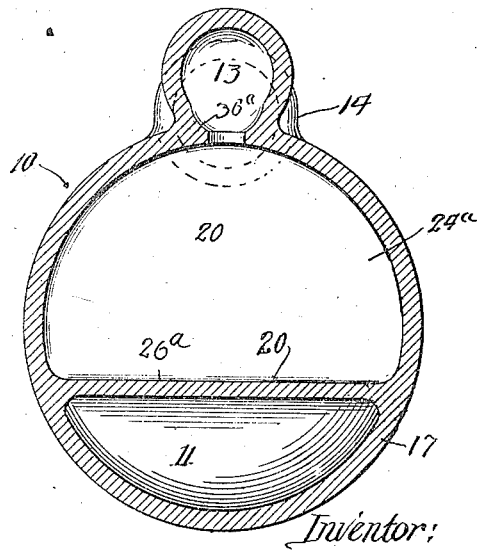
Witnesses:
George C. Otto.
Fannie F. Richards
Inventor:
Richard H. Thomas,
by Charles O. Shurvey
his Atty.

UNITED STATES PATENT OFFICE.

RICHARD H. THOMAS, OF CHICAGO, ILLINOIS, ASSIGNOR TO L. A. THOMAS, OF CHICAGO, ILLINOIS.

TRAP-VALVE.

1,024,163.  Specification of Letters Patent.  Patented Apr. 23, 1912.

Application filed April 3, 1911. Serial No. 618,494.

*To all whom it may concern:*

Be it known that I, RICHARD H. THOMAS, a citizen of the United States, residing at Chicago, in the county of Cook and State of Illinois, have invented new and useful Improvements in Trap-Valves, of which the following is a specification.

This invention relates to trap valves, and more particularly to improvements in trap valves of that class constructed and arranged to facilitate the discharge of water of condensation, steam and air from radiators or other heating coils of steam heating systems.
One of the objects of this invention is to produce a comparatively cheap, simple, and practicable trap valve of the class described; to provide means whereby the noise usually attendant in the ordinary trap valves is eliminated; to provide means whereby grit, sand and other foreign matter may freely escape and not interfere with the perfect operation of the device, and to provide a water seal in a chamber from which the water of condensation may be directly discharged from the trap valve.

With these objects, and other objects and advantages in view, the invention consists in the several novel features of construction, arrangement and combination of parts hereinafter described and claimed.

In the drawings furnished herewith, Figure 1 is a central, vertical, longitudinal section through a trap valve embodying my present invention, Fig. 2 is a vertical cross section taken on the line 2—2 Fig. 1 and Fig. 3 is a vertical cross section taken on the line 3—3 Fig. 1.

Referring to said drawing, 10, represents a hollow valve body formed with a receiving chamber 11, having an inlet 12, at one side and communicating with an outlet 13, at the opposite side. The inlet is in the form of a passage contained in a nipple 14, adapted for connection with a radiator or other heating coil (not shown) of a steam heating system, one form of connectic.. comprising as shown, a flanged nipple 15, and a coupling nut 15ᵃ, secured upon the threaded end of the nipple 14, and coupling the flanged nipple thereto. In accordance with the common practice the trap valve is coupled to the radiator or other heating coil near the bottom of the end coil at the return end of the radiator. The outlet 13, is arranged for connection with the return pipe (not shown), the wall of the outlet being threaded internally to receive the return pipe.

Preferably the body 10, is cast with a cylindrical portion 17, open at one side and containing the chamber 11, communicating directly on the inlet side with the inlet, and communicating indirectly with the outlet 13, through a passage in a hollow weir 20, that projects down into the chamber 11, and extends across the same from side to side, dividing it into two vertical portions 21, 22, that open into each other below the weir, as shown.
In the particular form illustrated, the weir has two transverse walls 24, 24ᵃ, that join the cylindrical wall 25, of the valve body and merge into each other at the bottom, as seen at 26ᵃ. In the form illustrated, the transverse wall 24ᵃ, extends above the cylindrical portion of the valve body, separating the inlet passage from direct communication with the outlet passage. The transverse wall 24, has a port 26, for establishing communication between the chamber 11, and the passage in the hollow weir, whereby a continuous water passage is formed, leading from the inlet, down around the weir in the chamber into the interior of the weir and out through the outlet or discharge passage, as indicated by the arrows in Fig. 1.

Means are provided for intermittently closing the port between the chamber and interior of the weir, which means in this instance, are shown as operated by variations of temperature in the chamber. In the particular form shown, a laterally expansible valve actuating member 27, is employed comprising, preferably, two opposing, outwardly-dished plates 28, 29, secured together at their marginal edges and containing a fluid 30, that expands under the influence of heat, thereby bowing or bulging the dished plates 28, 29, outwardly. The valve actuating member is adjustably secured in place within the portion 22, of the chamber, and in the form shown is rigidly secured to a post 31, threaded upon its free end and screwed into an internally threaded socket 32, formed in a cap or closure 33, that closes the open end of the chambered portion of the valve body. A plug or valve piece 34, is secured to the expansible member 27, on its side opposite the post 31, said plug or valve piece being finished to seat upon a valve seat 35, around the port 26. The parts are so proportioned and arranged that the plug or valve piece 34, normally remains unseated, leaving a free passage through the port, but when the member 27, is subjected to a high degree of temperature, its walls bulge outwardly and operate to seat the valve piece against the seat around the port 26.

It is to be observed that the finished end of the valve piece and the valve seat are arranged to lie in vertical planes; the object of this arrangement is to eliminate the danger of foreign particles lodging upon and accumulating upon the valve seat or valve piece.

I have shown a simple form of check valve in the discharge passage for the purpose of preventing water from collecting in the radiator, in case it is shut off from the steam supply by a hand operated valve. Said check valve comprises, as shown, a ball 36, arranged to seat upon a valve seat 36ª, at the top of the hollow weir, and one or more stops 37, for retaining the ball valve in the discharge passage. In case the radiator is shut off from the steam supply, the ball valve will seat under the influence of the partial vacuum caused by the condensing of the steam within the radiator.

Obviously the trap valve may be employed in gravity or vacuum steam heating systems, and when used in a vacuum system, the outlet 13, is connected with the return pipe leading to the suction or vacuum pump.

In operation, steam enters the radiator and condenses therein, the water of condensation flowing in through the inlet passage and down into the chamber 11. If the radiator is free of water at the start, and a vacuum system is employed, the air contained in the radiator is first exhausted through the device, but as soon as the steam enters the chamber 11, and heats the expansible fluid in the member 27, up to a certain degree of temperature, the walls of the member 27, bulge outwardly, moving the valve piece over the port 26, preventing the further escape of steam. As the steam now condenses in the radiator, the water of condensation flows into the chamber 11, partially filling the same on both sides of the hollow weir, and forming a water seal between the inlet and discharge passages. As the water of condensation cools in the chamber, the fluid in the member 27, cools, permitting the dished plates thereof to assume their normal shape, thereby unseating the valve piece and opening the port 26, whereupon the accumulated water of condensation is immediately discharged out through the hollow weir and discharge passage. As soon as the water is discharged and the steam from the radiator strikes the member 27, the walls thereof are again bulged outwardly and the valve piece again seated, closing the port and preventing the escape of steam.

I realize that various alterations and modifications of this device are possible without departing from the spirit of my invention, and I do not therefore desire to limit myself to the exact form of construction shown and described.

I claim as new and desire to secure by Letters Patent:

1. A hollow valve body comprising a receiving chamber for accumulating of water of condensation, said chamber having an inlet and an outlet out of direct communication with each other, and a hollow weir projecting down into said chamber from its top and extending from side to side thereof to form a trap therein, the passage in said weir leading to said outlet at its upper end, and opening into said chamber through a port at its lower end, in combination with a valve piece adapted to close said port, and contractible and expansible valve operating mechanism, actuated by the accumulation of water in said chamber to unseat said valve piece.

2. A hollow valve body comprising a receiving chamber, having an inlet and an outlet at the top of the chamber, out of direct communication with each other, and a hollow weir projecting down into said chamber from its top and extending across the side thereof from side to side to form a trap therein, the passage through said weir opening to the chamber through a horizontal port, and leading to the outlet, in combination with a valve piece for closing said port, and contractible and expansible valve operating mechanism within said chamber, actuated by the accumulation of water therein to open the port.

3. A hollow valve body comprising a receiving chamber for accumulating water of condensation, said chamber having inlet and discharge passages at the top of said chamber and out of direct communication with each other, a vertical hollow weir projecting down from the top of said chamber and forming a trap therein, the passage in said weir communicating with said discharge passage and opening to said chamber through a port, in combination with a valve piece, for covering and uncovering said port, and an expansible and contractible member, operating to seat and unseat said valve piece under the influence of temperature variations within said chamber.

4. A hollow valve body comprising a receiving chamber having an inlet and an outlet, and a hollow weir projecting down into the chamber at its top and extending from side to side thereof to form a trap therein, the passage in the weir leading to the outlet and opening into the chamber through a horizontal port, in combination with a laterally expansible and contractible member, and a valve piece carried thereby and arranged to open and close said port, said member acting to seat the valve piece under the influence of a high degree of temperature and to unseat the valve piece under the influence of a lower degree of heat.

5. A valve body, comprising a receiving chamber, a hollow vertical weir projecting down from the top of said chamber and extending across the same from side to side to form a trap therein, said chamber having an inlet passage, and having a discharge passage including a vertical passage through said weir, and opening into said chamber through a port surrounded by a vertical valve seat, in combination with a hollow, expansible member, containing an expansible fluid, and a valve piece carried by said member, and arranged to seat upon said valve seat, said member being arranged to expand and seat the valve piece when subjected to the influence of steam.

In witness whereof, I have hereunto signed my name, at Chicago, Cook county, Illinois, this 1st day of April 1911.

RICHARD H. THOMAS.

Witnesses:
 CHARLES O. SHERVEY,
 FANNIE F. RICHARDS.